United States Patent [19]

Bacsik

[11] 4,332,546

[45] Jun. 1, 1982

[54] PROCESS AND APPARATUS FOR FURNACE OPERATION WITH GAS SEAL

[75] Inventor: George J. Bacsik, Fanwood, N.J.

[73] Assignee: Exxon Research & Engineering Co., Florham Park, N.J.

[21] Appl. No.: 147,396

[22] Filed: May 7, 1980

[51] Int. Cl.³ .............................................. F23J 15/00
[52] U.S. Cl. ...................... 431/5; 431/202; 431/207; 122/7 R; 137/602; 110/162
[58] Field of Search ............ 431/5, 11, 20, 202, 431/207, 215, 356; 110/162, 163; 126/307 A; 60/39.5; 98/119; 137/251, 602, 154; 122/7 R, 7 B, 1 R; 422/204

[56] References Cited

U.S. PATENT DOCUMENTS

| | | | |
|---|---|---|---|
| 2,926,493 | 3/1960 | Poole et al. | 60/39.5 |
| 3,118,429 | 1/1964 | Hochmuth | 122/7 R |
| 3,301,223 | 1/1967 | Boyen | 122/7 R |
| 3,424,695 | 1/1967 | Von Wiesenthal | 252/373 |
| 3,561,405 | 2/1971 | Tramuta | 122/7 R |
| 3,605,776 | 9/1971 | Fullam | 137/251 |
| 3,789,804 | 2/1974 | Aguet | 122/1 R |
| 3,795,485 | 3/1974 | Bogart | 422/190 |
| 4,085,708 | 4/1978 | Ashdown | 122/7 B |

FOREIGN PATENT DOCUMENTS 1200227 7/1970 United Kingdom.

OTHER PUBLICATIONS

"Save Energy in Ammonia Plants", Marcel J. P. Bogart, *Hydrocarbon Processing*, Apr. 1970, pp. 145–151.

*Primary Examiner*—Samuel Scott
*Assistant Examiner*—Lee E. Barrett
*Attorney, Agent, or Firm*—Rebecca Yablonsky

[57] ABSTRACT

The invention relates to a method of operating a furnace with gas turbine exhaust as preheated combustion air, in which a gas seal is used. The gas seal housing may for example be a J-shaped tubular device depending from the duct through which the exhaust air flows to the burners, and is open at one end to the duct and open at the other end to the atmosphere. The variation permissible of duct pressure atop the seal in order to keep the seal intact is a function of the vertical range of the interface between the gases in the device and the difference in density between the two gases and can be controlled by adjustment of the damper setting. In normal operation the hot exhaust air flows to the furnace burners under the suction controlled by the damper. The seal is disrupted when the flow of exhaust air is reduced, the colder atmospheric air then being admitted and flowing to the burners so that the furnace continues in operation.

25 Claims, 7 Drawing Figures 4,332,546

PROCESS AND APPARATUS FOR FURNACE OPERATION WITH GAS SEAL

BACKGROUND OF THE INVENTION

1. Field of the Invention

This invention relates to a method of furnace operation and apparatus in which a gas seal is used, in particular where gas turbine exhaust (GTE) is employed as preheated combustion air for burning the fuel in the furnace burners.

The furnaces contemplated may be used for various hydrocarbon conversions such as the steam reforming of natural gas or light hydrocarbons by steam to hydrogen and carbon oxides, which is especially useful in ammonia plants; and in steam cracking to convert petroleum fractions such as ethane up to naphtha and gas oil to lighter products, especially $C_2$-$C_4$ olefins and heavier. In steam cracking the feed is generally mixed with from about 20 to 92 mol % steam and heated to temperatures in the range of about 1200° to 1800° F.

The operation of such furnaces requires the expenditure of large amounts of energy and increasingly is becoming the object of study in order to reduce fuel usage.

One approach to this is to use preheated combustion air in burning the fuel. For example, the exhaust gas from gas turbines may be used. Turbines of this type find use in many plants for supplying power, for example in steam cracking plants for driving olefin gas compressors and/or refrigerant compressors. The gas turbine exhaust is generally available at temperatures in the range of about 400° to about 1000° F. and contains oxygen in the range of about 15 to about 20 weight %.

One problem that arises in reusing the air in the exhaust from a gas turbine—which is a by-product of its operation—is that the turbine is run in accordance with its own schedule, viz., its own duty, thus may be shut off at times with consequent interruption of the flow of GTE to furnaces utilizing it as combustion air. Conversely, before start-up or on shutting down a furnace or one or several of a multi-furnace plant, the flow of GTE from the turbine is not needed.

According to the present invention an apparatus and method wherein a gas seal is used, are provided in which the furnaces are uncoupled from the gas turbine in the sense that the furnaces may be operated independently of the turbine and the turbine may be operated independently of the furnaces. Additionally, any one of a group of furnaces may be operated independently of the others in the group.

In the event that a gas turbine trips, one concern is that the furnace may become starved for oxygen temporarily. The resulting build-up of a high concentration of hydrogen or hydrocarbons in the furnace atmosphere followed by a sudden surge of oxygen, has the potential for causing an explosion and fire. An advantage of the gas seal of the invention is its rapid response time. When a gas turbine trips, the seal operates rapidly to admit cold air from the atmosphere, which it has up to then blocked off, and allow it to flow to the furnace burners as combustion air. This is an excellent safety feature.

2. Description of the Prior Art

The use of GTE as preheated combustion air in steam reforming furnaces is known from the following publications U.S. Pat. No. 3,424,695 issued Jan. 28, 1969 to von Wiesenthal.

U.S. Pat. No. 3,795,485 issued Mar. 5, 1974 to Bogart (Flour Corp.)

"Hydrocarbon Processing," Apr. 1978, p. 145-151, by Bogart.

U.K. Pat. No. 1,200,227 published on July 27, 1970, is also of some interest.

However, these workers have not addressed the problem of uncoupling the gas turbine from the furnace. Neither the gas seal of this invention nor any other means is shown for permitting them to be operated independently of each other.

In U.S. Pat. No. 4,085,708 issued on Apr. 25, 1978, to Ashdown (Foster Wheeler Energy Corp.) this problem is considered in connection with running a waste heat steam boiler but it may be noted that at all times a primary source of air supplied by a forced draft fan is used for at least some of the combustion air needs. As regards the secondary source of air, it is supplied either by gas turbine exhaust or by air supplied by a second forced draft fan, the switching being controlled by the opening or closing of mechanical obstructing means. See also U.S. Pat. Nos. 3,301,223 and 3,118,429.

U.S. Pat. No. 3,789,804 discloses a method of connecting the exhaust of a second gas turbine to the burners of a steam generator, if a first one should fail. It may be noted that two turbines have to be available and that a gas turbine has to be in operation at all times so that the system is not really uncoupled. Furthermore, the switchover is accomplished by means of valves.

SUMMARY OF THE INVENTION

During the normal operation of a furnace it may be necessary to vary the setting of the furnace damper to vary combustion air flow (draft changes also), for example, if one wants to change the furnace heat transfer duty by changing the flow rate of fuel to the furnace and correspondingly the flow rate of combustion air to it. On the other hand, one may wish simply to change the air combustion flow rate, i.e., to vary the draft in order to strike a desired balance between making the combustion reaction go to completion and achieving maximum furnace efficiency. Also, minor variations in the draft may occur because of wind at the exit of the stack and the like. The present invention teaches using a hot leg of gas to balance a cold leg of gas and thereby provide or permit a range of pressures at the seal over which the gas seal will remain intact and which, when exceeded, automatically allows some air addition to the GTE or excess GTE to be safely released to the atmosphere depending on furnace requirements. Thus the seal has the flexibility needed for furnace performance through the operation of the stack damper. This is achieved by means of apparatus comprising a novel gas seal tubular or duct-like device of a manometer type, inserted in the duct through which GTE is flowing to the burners, one end of this device being open to the atmosphere.

Seal range is defined as the vertical range or height between the maximum (low) and minimum (high) level over which the gas interface can move. The following equation applies (see "Flow Measurement with Orifice Meters" R. F. Stearns et al, D. Van Nostrand Co., New York, pp. 4-10):

$$P = H(\rho\text{air} - \rho\text{GTE})c \qquad \text{Equation 1}$$

where P is the range of duct pressure atop the seal in inches of water, H is height in feet, $\rho$ is density in pounds per cubic foot, and c is the factor to convert from pounds per square foot to inches of water.

According to the invention an apparatus is employed which comprises at least one gas turbine and one or several furnaces each having evacuating means for flue gases comprising a stack and/or induced draft fan, with associated damper controls, and provided with burners for burning a mixture of fuel and air; a duct connecting the gas turbine exhaust outlet to the burners for GTE to flow thereto, and means opening into the GTE duct encompassing a gas seal wherein a leg of hot GTE coming down from the duct is held in by a leg of colder atmospheric air open to the atmosphere. The atmospheric air is at a lower temperature giving it a higher density than the GTE at the conditions of use and most conveniently is at ambient temperature. The form of the means housing the gas seal is not particularly limited but uses the principles of a manometer. For example, it may be a U-shaped tube or loop, opening at one end into the GTE duct and open at the other end to the atmosphere. Alternatively, it may be a tube within a tube. However, other structures which can function in the same manner may be employed. A hood may be provided at the opening to the atmosphere. When there are several furnaces a manifold may be used which connects a GTE main duct to individual ducts to the individual furnaces, each duct having flow restricting means.

The factors which determine the range of pressure over which the seal can operate are the seal height and the difference in density between the two gases (see Equation 1). If the latter is fixed, the seal pressure range can be selected by selecting the desired height and is thus a matter of choice. However, practical considerations of convenience as regards the height of the unit may be limiting. For practicability the seal pressure range will generally be about 0.2 inches water but may be as high as 0.4 inches water.

The open stack exerts suction to cause flow of the GTE in the duct to the burners. The duct pressure atop the seal is controlled by adjusting the setting of the stack damper in the furnace concerned. It may be noted that the damper need not be located in the stack. In a case where several furnaces share a single stack, the damper of each furnace will be in the breeching and each will function independently of the others. In this application the term damper with reference to furnaces is intended to include inlet guide vanes which may be used with induced draft fans, which perform the same function.

In normal operation, GTE flows to the furnace burners under the draft of the stack pulling the flue gases out of the furnace. The gas seal is maintained over all interfacial levels of the two gases within the selected operating pressure range of the seal. The colder air acts as a plug, sealing in the hot GTE. Since the colder, heavier air is not above the hot GTE, there are essentially no convective currents to disturb the seal. The position of the gas interface may be monitored and/or controlled by temperature indicating, controlling, and/or alarming thermocouples. In controlling mode, these and/or a suitable pressure sensing device will actuate the stack damper. Thermocouples may also be used to monitor air introduced into the GTE as well as GTE vented to the atmosphere.

The position of a given furnace stack damper (for a given burner setting) controls the amount of suction exerted on the GTE atop the corresponding seal. When the gas turbine trips, GTE flow to each furnace slows down while increasing quantities of cold air are pulled into the furnaces. The furnaces continue to operate safely and satisfactorily. As GTE flow gradually diminishes, for a given setting of the stack damper an increasingly stronger suction is exerted in the GTE duct atop the seal at each furnace. This suction accelerates the intake of cold air into the furnace via the seal. In this sequence, it follows that there is no GTE exerting pressure on the GTE leg of the manometer. Thus, the cold air in the other leg is sucked into the furnaces. The supply of oxygen needed for combustion of fuel is thus continued so that the furnaces continue smoothly in operation.

When a particular furnace is shut down, i.e., the vacuum exerted by the damper position and the cooling stack gases is substantially reduced, flue gases build up in it until the pressure thereof blocks flow of GTE thereto and forces it to flow out to the atmosphere through the opening for atmospheric air and the hood. In the particular case illustrated, the hood contains cold air which mixes with and cools the hot GTE before it emerges when that is desirable.

Thus, the gas seal can be disrupted in either of these two ways, making it possible for the furnaces to continue in operation independently of the gas turbine or for the gas turbine to continue in operation independently of the furnaces and for any furnace in a group of them to operate independently of the others.

Furthermore, it is within the scope of the invention to operate the furnaces so as to achieve a combination of effects, viz., by adding some cold air continuously to the GTE; or, while supplying GTE to the burners, continuously rejecting some GTE to the atmosphere. These effects can be achieved by reducing/increasing the supply of GTE from the turbines or alternatively by varying the setting of the furnace damper. Such conditions represent states in which the seal range of duct pressure is exceeded with, however, the furnaces still functioning as well as the gas turbines still supplying exhaust as combustion air.

DETAILED DESCRIPTION

Figure 1:
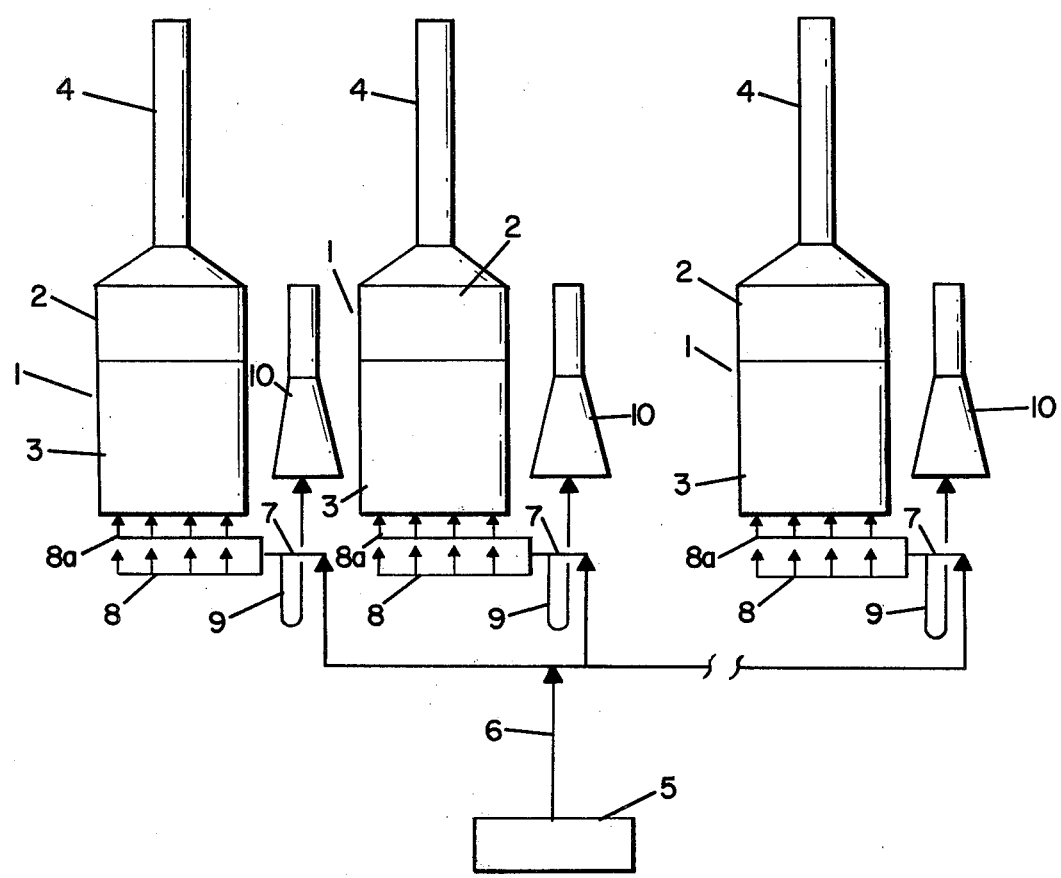
FIG. 1 is a schematic drawing of a group of steam cracking furnaces using the gas seal of the invention.

The invention will be described with reference to the drawings. In FIG. 1, which is to be considered illustrated but not limiting, a group of steam cracking furnaces is schematically represented, furnace 1 being the prototype.

Figure 3:
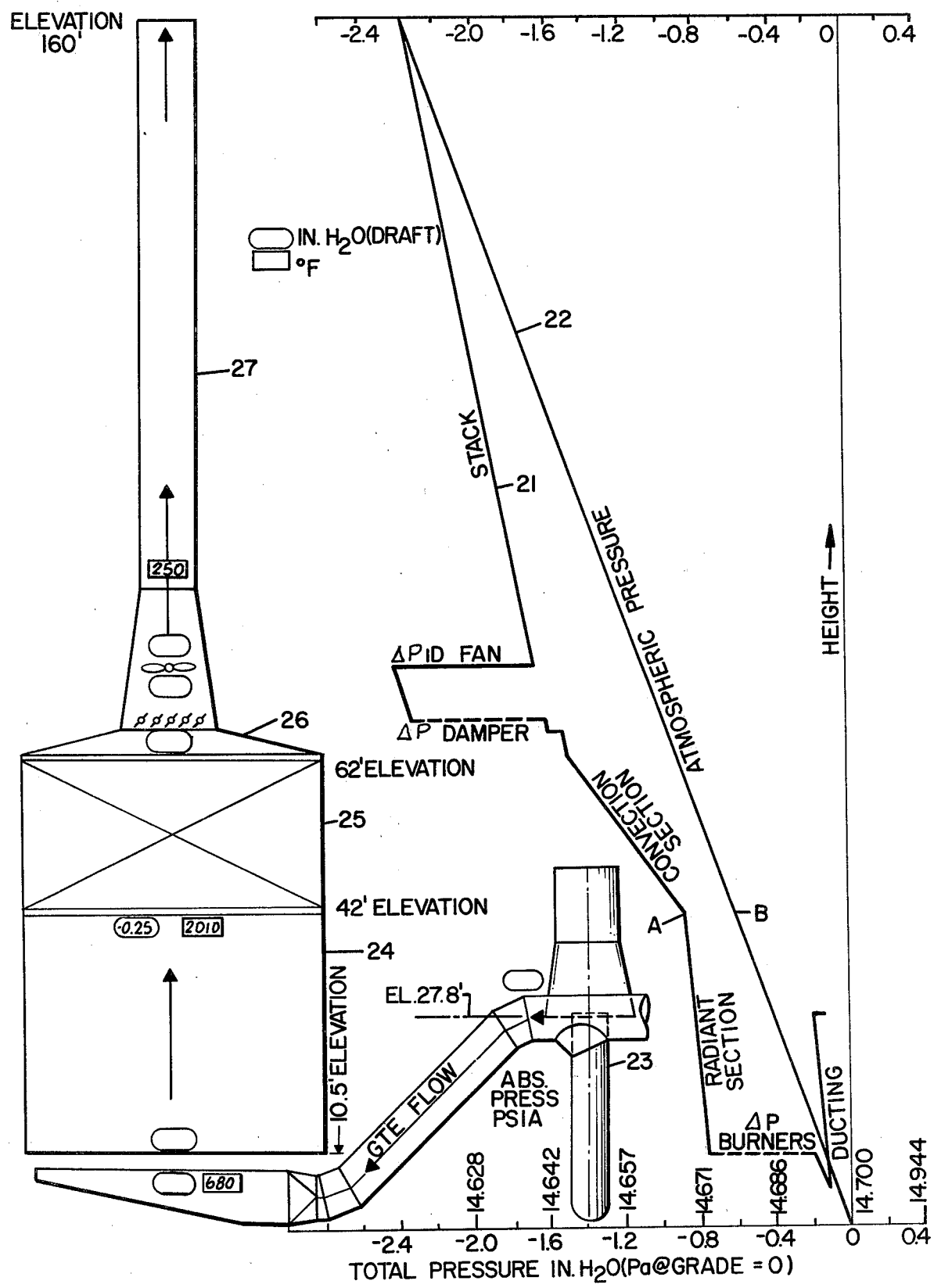
FIG. 3 is a plot of typical total pressure at various points in the furnace and seal system, versus height.

Pyrolysis coils (not shown) through which a steam cracking feed of the type described above is passed, are located within the furnace 1. The furnace comprises a convection section 2, a radiant section 3 and a stack 4. Burners and a fuel supply means (not shown) are provided at the bottom. One or several gas turbines indicated at 5, supply hot GTE, for example, at a temperature of about 680° F. and with an oxygen content of about 18.6 weight %, via line 6 and GTE duct 7 to the burners via two (or more) parallel manifolds 8 and 8a. A gas seal housing 9 comes down from the GTE duct 7, in open communication therewith, for example in the form of a loop or U-tube in this illustration. Suitably, it is in a plane at right angles to the GTE duct 7, as shown in FIG. 3, to allow the other end to be open and have access to the atmosphere, viz., colder air at about 60° F. A hood 10 surrounds the open end of the U-tube in this illustration.

The gas turbine exhaust may be at about 955° F., but a heat exchanger preheats compressed air from about 250° to 500° F. for the gas turbine while extracting heat from the gas turbine exhaust, cooling it from about 955° to 680° F. In another illustration, this heat exchanger may be omitted.

Figure 2:
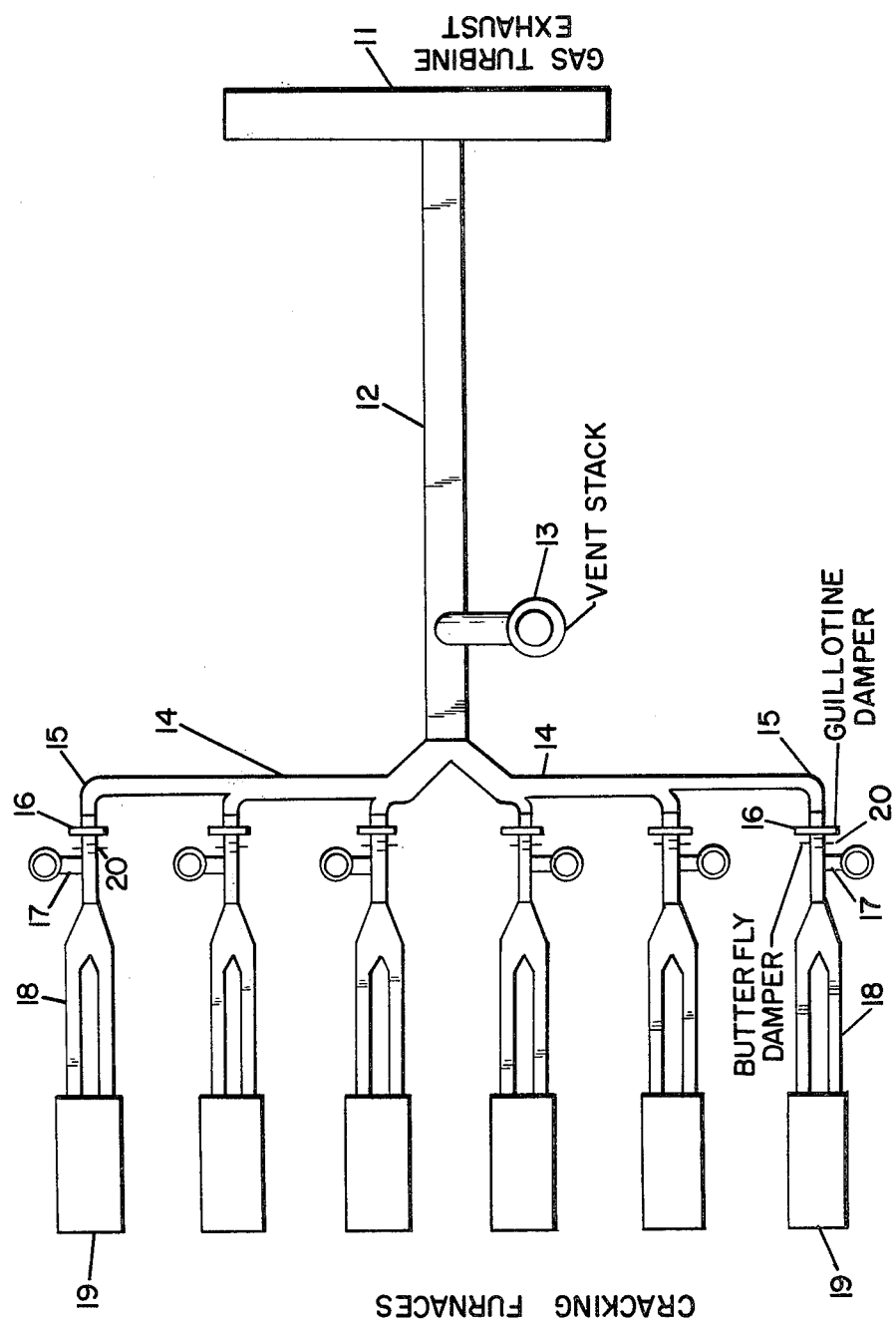
FIG. 2 shows a gas turbine connected by a manifold to six furnaces.

FIG. 2 shows a steam cracking unit having six furnaces. The gas turbines indicated at 11 send their exhaust through the main GTE duct 12, in which a vent stack 13 is provided for use in running the gas turbines independently of the furnaces such as during start-up or on shutting down. The main duct 12 is connected to the manifold 14 used to distribute GTE to each of six furnaces. GTE flows to each furnace by duct 15 via a guillotine damper 16 which can only be either open or shut (required to isolate a furnace for maintenance, etc.), over the inlet end of the seal 17 provided for each furnace, then through the forked ducting 18 to the floor burners of each furnace 19. A fixed partial butterfly damper 20 may be provided in the GTE duct 15 to each furnace for use in balancing the design flow among the six cracking furnaces, i.e. to tune the system. In the event that a furnace is to remain out of service for some time and one wants to avoid continued release of GTE to the atmosphere, the guillotine damper 16 is closed. The GTE flow may be redistributed among the furnaces remaining in operation by the dampers of the individual furnaces.

FIG. 3 is a further aid to understanding the invention. A typical profile of total pressure in inches of water (relative to atmospheric pressure at grade or ground level, i.e., $P_A$ at grade=0 inches water) plotted against height or elevation at various points in the GTE and cracking furnace system is shown in FIG. 3 by line 21. Absolute pressure in psia is also indicated. Also, a profile of atmospheric pressure (taken at 60° F.) is shown by line 22. At a given elevation, the difference between line 21 and line 22 represents the draft or suction or partial vacuum, i.e., less than atmospheric pressure, normally in inches water at that specific point or elevation in the system. The difference in pressure at Point A of curve 21 and Point B of curve 22 represents the draft at the furnace bridgewall, i.e., the junction of the convection and radiation sections of the furnace. It is not particularly critical so long as some vacuum is maintained for safety. A suitable draft for furnace operation is about 0.05 to 0.50 inches water as measured at the furnace bridgewall. The bridgewall draft, and also the GTE pressure atop the seal of a furnace, can be automatically controlled by adjusting the setting of the stack damper, i.e. the damper $\Delta P$ of FIG. 3.

GTE flow is shown by the arrows, starting at the right at the top of the seal 23 which is shown in side view. GTE flow is to the left and downward to the floor burners in the apparatus and downward slightly to the right then upward to the left in the pressure profile. A pressure drop, $\Delta P$ burners, is taken across the floor burners. In the radiant 24 and convection 25 sections, flow is upward while total pressure decreases slowly first and then faster across the convection section. The profile 21 reflects the pressure drop incurred in the breeching 26 and at the entrance to the stack 27 (shown as furnace supported in this illustration). The pressure drop across the stack damper as well as the head provided by the centrifugal induced draft fan $\Delta PID$ (included in this illustration) are also incorporated in the pressure profile. The furnace system pressure and the atmospheric pressure profiles gradually approach each other with increasing elevation and finally converge at the outlet of the stack.

Figure 4:
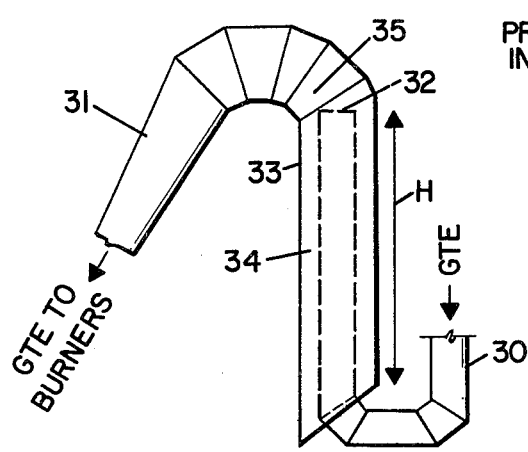
FIG. 4 shows a tube within a tube seal device.

Another form of gas seal housing is shown in FIG. 4 and comprises a GTE duct made up of cooperating tubular ducts 30 and 31. Duct 30 terminates in a vertical duct member 32 which enters an outer or sleeve duct member 33 of duct 31. Sleeve 33 surrounds preferably the entire length of vertical duct member 32 preferably coaxially and in spaced relation thereto leaving an annular channel 34. The seal range H is indicated in FIG. 4. It corresponds to the length of the channel 34 viz., the length of duct member 32 to the extent it is covered by sleeve 33. Sleeve 33 may be shorter than the vertical duct member 32 but in that case the seal range H will be correspondingly shorter. Sleeve 33 may be slanted at the bottom, as shown, to protect personnel on the ground.

In operation, GTE flows from the distribution manifold and flows upward in the inner duct 32 of the tube-in-tube seal. GTE exits the inner duct at the top of seal 35 and flows to the burners via duct 31. The annular space 34 between the inner and outer vertical duct members serves as the channel for introducing cold air or venting GTE to the atmosphere.

The following illustrates the method of calculating the range of duct pressure atop the seal for a particular seal range or height H, or vice versa, using Equation 1 given above.

For GTE having an $O_2$ content of 19.01 weight %, the following data can be obtained:

TABLE 1

| Fluid | GTE | Air |
|---|---|---|
| °F. | 680 | 60 |
| Mol. Wt. | 28.59 | 28.84 |
| ρ lb/cu/ft. at conditions | 0.0344 | 0.0761 |

Projecting a height of 23 feet, one can find the duct pressure range by substituting in Equation 1 as follows:

$$P = 23 (0.0761-0.0344)$$
$$= 0.959 \text{ lb./sq.ft.}$$
$$= 0.00666 \text{ lb./sq.inch}$$
$$= 0.1846 \text{ inches } H_2O$$

Figure 5A:
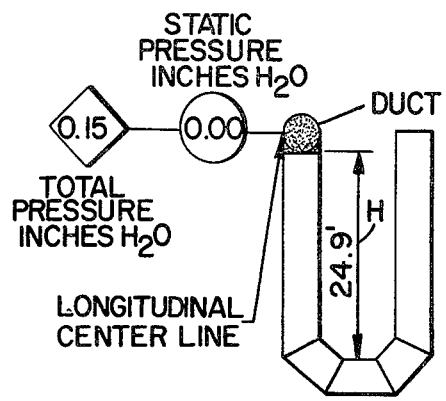
FIGS. 5a and 5b show front views of the loop seal with high gas interfacial level and low gas interfacial level, respectively.
Figure 5B:
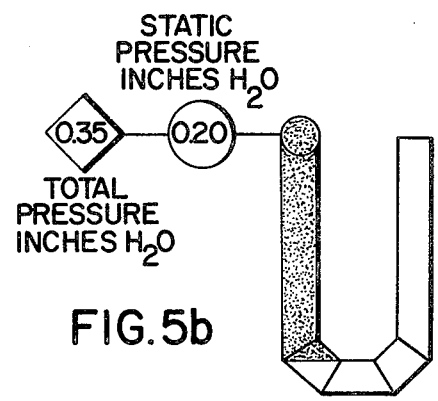

FIGS. 5a and 5b depict a U-shaped or loop manometer device. In practice, the right member of the loop seal, which is open to the atmosphere, could end at any desired elevation. The minimum (high) interfacial level and the maximum (low) interfacial level are indicated respectively. At those levels and at all levels in between, or intermediate levels, there will neither be GTE escaping to the atmosphere nor cold air being pulled in to the furnace burners. The height H indicated pertains to the left or GTE leg; the height of the right leg is not critical and may be equal to, greater or preferably smaller than that of the left leg, viz., the unit could be a J-shaped loop device. In fact, by analogy to the tube-in-tube seal, the device may consist solely of the left leg, open to the atmosphere at the bottom, with the rest of the U-tube removed; and this constitutes another form of gas seal housing. The process, in this aspect, is distinguishable from measurement of a pressure differential with a U-tube in that the object is not measurement (in fact a part of the U-tube ordinarily used for measuring can be eliminated) but is utilization of the sealing-in effect of the seal fluid which in this case is air, not mercury. When the atmospheric air passes beyond the high level shown in FIG. 5a, and enters the GTE duct, it becomes subject to the furnace system pressure at that point, i.e., the draft or suction exerted on the GTE flowing in the duct, and the amount of outside air drawn to the burners depends on the degree of vacuum. Conversely, when the GTE passes beyond the low level, shown in FIG. 5b, and flows out to the atmosphere, it does so as a consequence of the GTE supply being excessive for the draft or pressure in the GTE duct.

For illustrative purposes, FIG. 5a shows the high interfacial level for GTE flow where the velocity head, $P_V$, is 0.15 inches water and the total pressure is the same, measured at the GTE duct longitudinal center line; and FIG. 5b shows the low interfacial level where $P_V$ is 0.15 inches water, the static pressure $P_S$ is 0.20 inches water and the total pressure is 0.35 inches water. The range of duct pressure atop the seal is thus 0.20 inches water and the seal height H is 24.9 feet.

The total pressure atop the seal can be controlled by adjusting the setting of the furnace damper.

When the gas turbine trips and GTE is no longer flowing to the furnace burners, a vacuum is created in the GTE leg. That is to say, the pressure drops below the minimum level of the seal. The cold air is then sucked in and flows to the burners so that furnace operation continues. Conversely, when a furnace is shut down and the damper closed, pressure of the GTE and of flue gases builds up in the GTE leg. That is to say, the pressure increases above the maximum level of the seal. The GTE is then forced out to the atmosphere.

Figure 6:
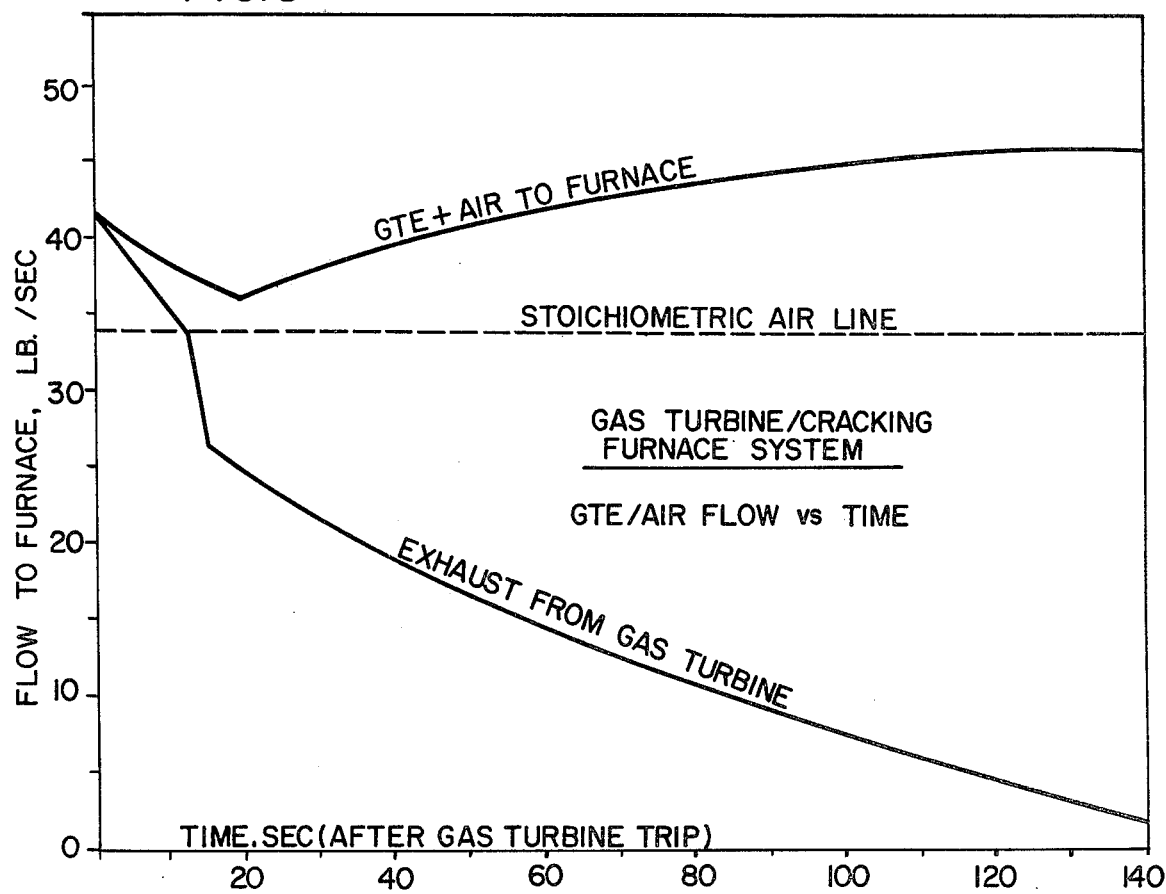
FIG. 6 is a plot of GTE/air flow versus time after a gas turbine trip.

GTE plus make-up air flow to a typical furnace following a gas turbine trip is shown in FIG. 6. Flow to the furnace in lb./sec. is plotted against time in seconds following a gas turbine trip. GTE flow decreases slowly initially, then faster as the gas turbine inlet guide vanes close, and finally slowly again as the gas turbine winds down. Total flow to the furnace drops initially and then increases gradually. Air make-up is the difference between the top and bottom curves at any time. A line representing stoichiometric air flow for the design fuel rate is included in the plot for reference. The minimum total flow to the furnace remains above the stoichiometric requirements, viz., the air line.

Thus, the invention provides a gas seal to be operated in conjunction with furnaces, whereby GTE can be used as combustion air in a manner such that the gas turbine and the furnaces are uncoupled, that is, can operate independently of each other. It responds automatically to changes in conditions to supply air/GTE as various circumstances require. In one condition it admits GTE as preheated combustion air; in another condition it admits atmospheric air as combustion air; and in another it causes GTE to flow out to the atmosphere. However, it can also operate in other ways, if desired, to send any chosen mix of GTE and cold outside air to the burners continuously as combustion air or to send GTE to the burners while continuously rejecting excess GTE to the atmosphere. The seal per se functions without the intervention of any moving or mechanical parts in the GTE duct physically admitting or obstructing gas flow. The absence of such mechanical parts ensures durability and low maintenance costs. The safety factor is high owing to the gas seal's rapid response time. The seal can have a range which is practicable for furnace operation.

Consequently, the present invention has a number of advantages as compared with systems which either have no means for accomplishing these ends or have means which do not respond as rapidly.

Thus, the short response time is a fail-safe feature. The furnace can always be kept in operation if the gas turbine trips. For those plants that generate steam, using furnace effluent, through heat exchangers, this will permit continued operation of machinery driven by that steam even in the event that the gas turbine exhaust is lost. Consequently, steam supplies for refrigeration systems (included in a steam cracking plant to recover the valuable ethylene and lighter gases such as $H_2$) are maintained via continued passage of hot cracked effluent to heat exchangers for producing steam. With such heat exchangers a simplified system for producing this steam can be used as compared with more complex fuel fired systems. The equipment layout is thus improved. A pressure profile such as illustrated in FIG. 3 can be maintained or at least variations therefrom could be moderate as contrasted with a gas turbine trip with no other source of air supply where deviations from the normal pressure profile could be greater. From the fact that the present invention ensures continuous operation of the furnace with little or no upset in case of a gas turbine trip, it follows that coil outlet temperature of the pyrolysis tubes is controlled within the normal range as the furnace is kept onstream with the pyrolysis reaction kept going. Wide swings of temperature for pyrolysis tube alloys that are near the limit of their temperature tolerance, which would be harmful to these metals, are thus avoided. Therefore, since all conditions can be continuously maintained, furnace operability is rated high.

What is claimed is:

1. A method of operating a furnace in conjunction with a gas seal in which gas turbine exhaust containing oxygen (GTE) is used as preheated combustion air which comprises passing GTE in a duct to the furnace burners, operating evacuating means of the furnace including a damper to provide suction to remove flue gases and establish flow in the GTE duct, selecting a seal height of a leg in which GTE can come down from an outlet of said duct and plugging the leg below the GTE with colder atmospheric air of higher density than the GTE under the conditions of use to form a gas seal, by adjusting the setting of the furnace damper during operation to vary the duct pressure atop the seal within the range fixed by the selected seal height and the difference in density between the two gases; the gas seal being disrupted in case the flow of GTE is reduced, the atmospheric air then flowing to the burners under the suction controlled by the damper so that the furnace continues in operation.

2. A method of operating a furnace in conjunction with a gas seal in which gas turbine exhaust containing oxygen is used as preheated combustion air which comprises passing GTE in a duct to the furnace burners, operating the furnace damper to allow suction to remove flue gases and establish flow in the GTE duct, selecting a vertical range for a column of GTE to come down from an outlet of said duct, establishing a column of colder atmospheric air having a higher density than the GTE under the conditions of use and balancing the column of GTE against the column of atmospheric air having an interface therewith at the base thereof thereby forming a gas seal, by adjusting the setting of the furnace damper during operation to allow variation of duct pressure atop the seal within the range fixed by the difference in density of the two gases and said vertical range.

3. A method of operating a furnace in conjunction with a gas seal in which gas turbine exhaust containing oxygen is used as preheated combustion air which comprises passing the hot GTE in a duct to the furnace burners;

operating the furnace damper or the damper and induced draft fan to allow suction to remove flue gases and establish flow in the GTE duct;

establishing a column of GTE coming down from an opening of the duct;

establishing a column of colder air open to the atmosphere having a higher density than the GTE under the conditions of use and having an interface with the column of GTE at the bottom thereof;

defining a vertical range over which the gas interfacial level can move, and adjusting the setting of the furnace damper during operation to allow variation of duct pressure atop the seal within the range fixed by the difference in density between the two gases and the vertical range provided for the gas interfacial level according to the relationship $P = H(\rho\text{air} - \rho\text{GTE})$ thereby forming a gas seal obstructing flow of colder atmospheric air to the burners; the gas seal being disrupted in case the flow of GTE is stopped, the colder air then flowing to the burners under the suction controlled by the damper or the damper and fan so that furnace operation is continued.

4. A modification of the method according to any one of claims 1-3 in which the said range of duct pressure atop the seal is exceeded so that some colder atmospheric air is continuously added to the GTE.

5. A modification of the method according to any one of claims 1-3 in which the said range of duct pressure atop the seal is exceeded so that excess GTE is continuously rejected to the atmosphere.

6. A method according to any one of claims 1-3 in which the colder air is at ambient temperature and pressure.

7. A method according to any one of claims 1-3 in which the GTE is at a temperature in the range of about 400° to about 1000° F., and has an oxygen content of about 15 to about 20 weight %.

8. A method according to any one of claims 1-3 in which the GTE is at a temperature in the range of about 600° to about 950° F.

9. A method according to any one of claims 1-3 in which the range of duct pressure atop the seal is about 0.2 inches water.

10. A method according to claim 9 in which the GTE is at a temperature of about 680° F., the atmospheric air is at a temperature of about 60° F., the oxygen content of the GTE is about 19% and the vertical range provided for the gas interfacial level is about 25 feet.

11. A method according to any one of claims 1-3 in which a plurality of furnaces are operated in parallel in conjunction with the exhaust from one or more gas turbines.

12. A method according to any one of claims 1-3 in which the GTE is distributed in separate streams to furnaces operated in parallel and when any furnace is shut down, the flow of GTE thereto is diverted to furnaces remaining in operation by adjusting the dampers thereof.

13. Apparatus for furnace operation which comprises, in combination, at least one gas turbine emitting a hot exhaust gas containing oxygen (GTE) and one or several furnaces each furnace having means for evacuating flue gases including a damper and provided with burners for burning a mixture of fuel and oxygen; a duct for GTE connecting the gas turbine exhaust outlet to the furnace burners; and means opening into the GTE duct encompassing a gas seal wherein a leg of hot GTE coming down from the duct is held in by a leg of colder atmospheric air open to the atmosphere.

14. Apparatus for furnace operation which comprises, in combination, at least one gas turbine emitting a hot exhaust gas containing oxygen (GTE) and one or several furnaces each furnace having means for evacuating flue gases comprising a stack and/or induced draft fan, with associated damper controls, and provided with burners for burning a mixture of fuel and oxygen; a duct for GTE connecting the gas turbine exhaust outlet to the furnace burners; and a gas seal housing having a leg in which GTE can come down from an outlet of said duct and also having an opening for atmospheric air thereby to provide an interface between the air and said GTE at the base thereof, said leg defining a vertical range over which the gas interface can move.

15. Apparatus for furnace operation which comprises, in combination, at least one gas turbine emitting a hot exhaust gas containing oxygen (GTE) and one or several furnaces each furnace having means for evacuating flue gases comprising a stack and/or induced draft fan, with associated damper controls, and provided with burners for burning a mixture of fuel and oxygen; a duct for GTE connecting the gas turbine exhaust outlet to the furnace burners; and a gas seal housing comprising a U-shaped tube or loop connected at one end into the GTE duct and having an opening to the atmosphere at the other end.

16. Apparatus according to claim 15 in which the leg of the U-shaped tube or loop connected into the GTE duct has a height in the range of about 23 to 25 feet.

17. Apparatus for furnace operation which comprises, in combination, at least one gas turbine emitting a hot exhaust gas containing oxygen (GTE) and one or several furnaces each furnace having means for evacuating flue gases comprising a stack and/or induced draft fan, with associated damper controls, and provided with burners for burning a mixture of fuel and oxygen; a duct for GTE connecting the gas turbine exhaust outlet to the furnace burners and comprising a gas seal housing; said housing being formed from a vertical portion of the GTE duct and a sleeve portion of the GTE duct around the vertical duct portion and spaced therefrom to provide an annular channel, said channel being open at its base to the atmosphere.

18. Apparatus according to any one of claims 13-17 in which each furnace has a stack and a damper in the stack.

19. Apparatus according to any one of claims 13-17 in which each furnace has a stack and a damper and an induced draft fan which are located in the stack or breeching.

20. Apparatus according to any one of claims 13-17 in which one stack is provided for several furnaces and each furnace has a damper in the breeching.

21. Apparatus according to claim 15 or 16 in which the opening to the atmosphere is surrounded by a hood.

22. Apparatus according to any one of claims 13-17 in which there are several furnaces, which comprises a manifold; a main GTE duct connecting the gas turbine exhaust outlet to the manifold; a plurality of individual GTE ducts each connected between the manifold and a respective furnace, each individual GTE duct having flow restricting means; and a vent stack connected to the main GTE duct.

23. A method of operating the apparatus of claim 14 which comprises adjusting the setting of the furnace damper during normal operation to allow variation of duct pressure atop the seal within the range fixed by the difference in density between the two gases and the vertical range over which the gas interface can move.

24. Apparatus for furnace operation which comprises, in combination, at least one gas turbine emitting a hot exhaust gas containing oxygen (GTE) and one or several furnaces each furnace having means for evacuating flue gases including a damper and provided with burners for burning a mixture of fuel and oxygen; a duct for GTE connecting the gas turbine exhaust outlet to the furnace burners; and a gas seal housing comprising vertical ducting descending from the GTE duct opening into the GTE duct at one end and open at the other end to the atmosphere.

25. Apparatus according to claim 15 in which the gas seal housing comprises a J-shaped loop.

* * * * *